(No Model.)

W. M. CONWAY.
SHEET METAL VESSEL.

No. 287,243. Patented Oct. 23, 1883.

WITNESSES
Danl Fisher
Edw. J. Diggs

INVENTOR
William M. Conway.
by G. W. H. Howard
Attys.

N. PETERS, Photo-Lithographer, Washington, D. C.

UNITED STATES PATENT OFFICE.

WILLIAM M. CONWAY, OF BALTIMORE, MARYLAND.

SHEET-METAL VESSEL.

SPECIFICATION forming part of Letters Patent No. 287,243, dated October 23, 1883.

Application filed March 7, 1883. (No model.)

*To all whom it may concern:*

Be it known that I, WILLIAM M. CONWAY, of the city of Baltimore, and State of Maryland, have invented certain Improvements in Sheet-Metal Vessels, of which the following is a specification.

This invention relates to a sheet-metal vessel having a central thimble in its bottom, adapted to fit over an ordinary gas-burner and support the vessel, the shape and construction of the said thimble being such as to admit of the escape of gas around the burner in a downward direction, and not through the upper end of the thimble, which is closed.

Figure 1:
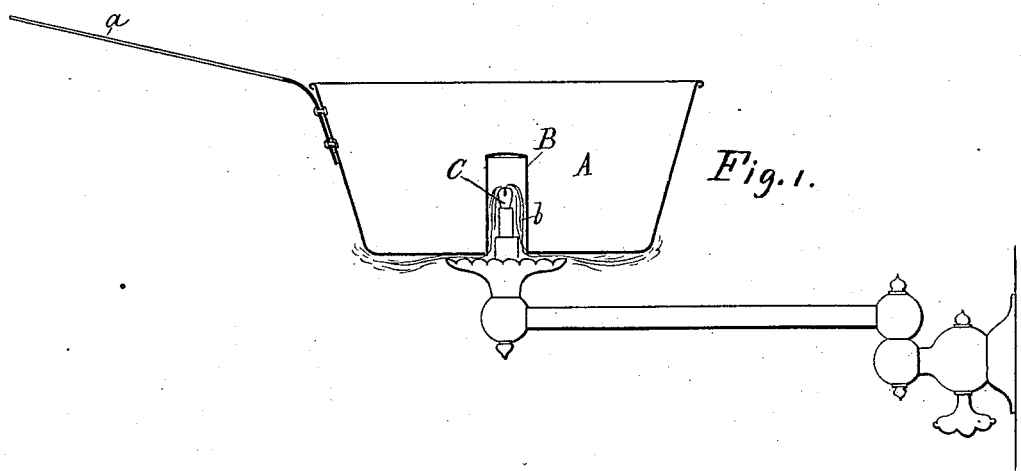
Figure 2:
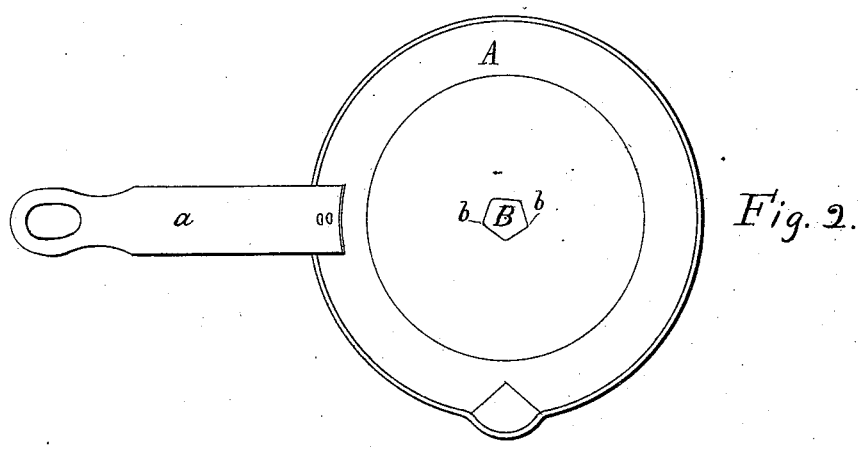

In the accompanying drawings, forming a part hereof, Figure 1 illustrates the application of a vessel to a gas-bracket, the vessel being shown in section. Fig. 2 is an under side view of the vessel.

Similar letters of reference indicate similar parts in the views.

A is the body of the vessel, having an ordinary handle, $a$, and B the thimble, closed at its upper end. C is the gas-burner, and if the same is of circular cross-section, as is usual, the thimble B is made of some polygonal shape, as shown in Fig. 2, in order that the vessel may be properly supported, and at the same time give apertures $b$ for the downward escape of gas. When the vessel is in place on the burner, the gas passes down the apertures $b$ and is ignited below the cup, the flame diffusing itself over the bottom and around the sides of the vessel.

I claim as my invention—

In combination with a gas-burner, the vessel A, having the thimble B and gas-escape apertures $b$, substantially as and for the purpose specified.

WM. M. CONWAY.

Witnesses:
    EDW. J. DIGGS,
    WM. T. HOWARD.